(12) United States Patent
Penny et al.

(10) Patent No.: US 8,292,102 B2
(45) Date of Patent: Oct. 23, 2012

(54) CONTAINER THREAD DESIGN

(75) Inventors: Michael E. Penny, Saline, MI (US);
Theodore F. Eberle, Ann Arbor, MI (US)

(73) Assignee: Amcor Limited, Hawthorn (AU)

(*) Notice: Subject to any disclaimer, the term of this patent is extended or adjusted under 35 U.S.C. 154(b) by 1144 days.

(21) Appl. No.: 11/821,119

(22) Filed: Jun. 21, 2007

(65) Prior Publication Data
US 2008/0314856 A1 Dec. 25, 2008

(51) Int. Cl.
*B65D 1/02* (2006.01)
*B65D 39/00* (2006.01)
*B29C 49/00* (2006.01)
*B65B 7/28* (2006.01)

(52) U.S. Cl. ........... 215/252; 215/44; 220/288; 425/522

(58) Field of Classification Search ......... 215/40.42–45, 215/250, 252, 329, 40, 42–45; 220/288; 425/522
See application file for complete search history.

(56) References Cited

U.S. PATENT DOCUMENTS

| 3,237,817 | A | * | 3/1966 | Wheeler | 222/519 |
| 3,297,213 | A | * | 1/1967 | Henderson | 222/542 |
| 4,098,419 | A | * | 7/1978 | Virog et al. | 215/252 |
| 4,756,438 | A | * | 7/1988 | Ryder | 215/252 |
| 5,040,692 | A | * | 8/1991 | Julian | 215/252 |
| 5,785,195 | A | * | 7/1998 | Zwemer et al. | 215/329 |
| 6,659,297 | B2 | * | 12/2003 | Gregory et al. | 215/252 |
| 6,905,080 | B2 | * | 6/2005 | Pohorecki | 239/280 |
| 7,694,835 | B1 | * | 4/2010 | Montgomery | 215/329 |
| 7,735,663 | B2 | * | 6/2010 | Tanaka et al. | 215/44 |
| 2003/0116522 | A1 | * | 6/2003 | Julian et al. | 215/252 |
| 2003/0124374 | A1 | * | 7/2003 | Bromley et al. | 428/542.8 |
| 2005/0263476 | A1 | * | 12/2005 | Harrison et al. | 215/44 |

* cited by examiner

*Primary Examiner* — Sue Weaver
(74) *Attorney, Agent, or Firm* — Harness, Dickey & Pierce, P.L.C.

(57) ABSTRACT

The present disclosure provides a container and a method of making a container. In one example, the container includes a body having an upper portion, a sidewall portion and a base portion. The upper portion includes a blown finish defining a longitudinal axis and an opening into the container. A tamper evident (TE) band is formed on the finish and defines a first diameter at an outermost surface. The TE band defines at least two disconnected radial protrusions. At least one thread is formed on the finish. The at least one thread defines a second diameter at an outermost surface. The first diameter is greater than the second diameter. The TE band defines a gap between each respective disconnected radial protrusion. Each thread defines a thread start portion and a thread run-out portion. A line parallel to the longitudinal axis extends through the thread run-out portion and the gap.

18 Claims, 5 Drawing Sheets

CONTAINER THREAD DESIGN

TECHNICAL FIELD

This disclosure generally relates to containers for retaining a commodity, such as a solid or liquid commodity. More specifically, this disclosure relates to a blown polyethylene terephthalate (PET) container having a blown container finish including a threaded area and a tamper evident (TE) band area.

BACKGROUND

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

In many applications, it is desirable to provide a closure or cap for mating with a finish of the bottle or container. Many such bottle and cap combinations are designed with a Tamper Evident (TE) breakaway band on the cap. Such a band is attached to the cap when initially applied to the corresponding bottle finish and upon opening the bottle for the first time, the band is designed to break away from the cap and thus remain on the bottle. Since the band only breaks away one time, the resulting effect proves whether or not a bottle has been tampered with or more specifically if the cap has been removed prior to the actual customer opening the bottle.

In the finish of a container, the TE band profile includes two diameters, which the standardized Packaging Industry labels as an "A-band" and a "B-band", respectively. A diameter of the A-band (A-diameter) is typically larger than a diameter of the B-band (B-diameter). The larger A-diameter represents a bulge in the container finish profile that is designed as a catch to stop and prevent the TE band of the cap from riding over the top of it in a reverse direction when the cap is removed from the container. The TE band of the cap is designed to ride over the A-diameter band profile of the container in a forward (downward) direction when the cap is initially applied to the container. The prevention of the band moving back up on the bottle when the cap is removed thus creates the necessary engagement interface and force that effectively removes the breakaway band from the cap and hence leaves it on the container finish.

Within the realms of the PET blow molding industry, where it is desirable to convert injection molded PET preforms into blow molded PET containers, it has been shown that any blow moldable detail that is designed and built into any given blow mold, be sized in such a way that ensures duplication of that mold detail onto the moldable surface of the given container. In the blow molding industry, it is generally accepted as being very difficult to achieve a desired blown definition of the actual mold surface when multiple ribs, channels, etc., are bunched close to each other on the actual mold surface. As a result, during the blow molding process, the TE band of the container finish may form properly while the thread run-out, or portion of the thread that is most closely positioned to the TE band, may not always form properly.

SUMMARY

Accordingly, the present disclosure provides a container and a method of making a container. In one example, the container includes a body having an upper portion, a sidewall portion and a base portion. The upper portion includes a blown finish defining a longitudinal axis and an opening into the container. A tamper evident (TE) band is formed on the finish and defines a first diameter at an outermost surface. The TE band defines at least two disconnected radial protrusions.

According to additional features, at least one thread is formed on the finish. The at least one thread defines a second diameter at an outermost surface. The first diameter is greater than the second diameter. The TE band defines a gap between each respective disconnected radial protrusion. Each thread defines a thread start portion and a thread run-out portion. A line parallel to the longitudinal axis extends through the thread run-out portion and the gap.

According to still other features, the finish defines a first thread and a second thread. The first thread defines a first depth at a thread start portion. The second thread defines a second depth at the thread run-out portion. The thread start portion and the thread run-out portion are longitudinally aligned around the finish. The first depth is less than the second depth. The first depth is approximately between 5-50% less than the second depth. The thread run-out portion and the gap are longitudinally aligned around the finish. The gap defines between approximately 5-32 degrees of the finish. The finish is a polyethylene terephthalate (PET) blown finish.

Additional benefits and advantages of the present disclosure will become apparent to those skilled in the art to which the present disclosure relates from the subsequent description and the appended claims, taken in conjunction with the accompanying drawings.

DETAILED DESCRIPTION

The following description is merely exemplary in nature, and is in no way intended to limit the disclosure or its application or uses.

Figure 1:
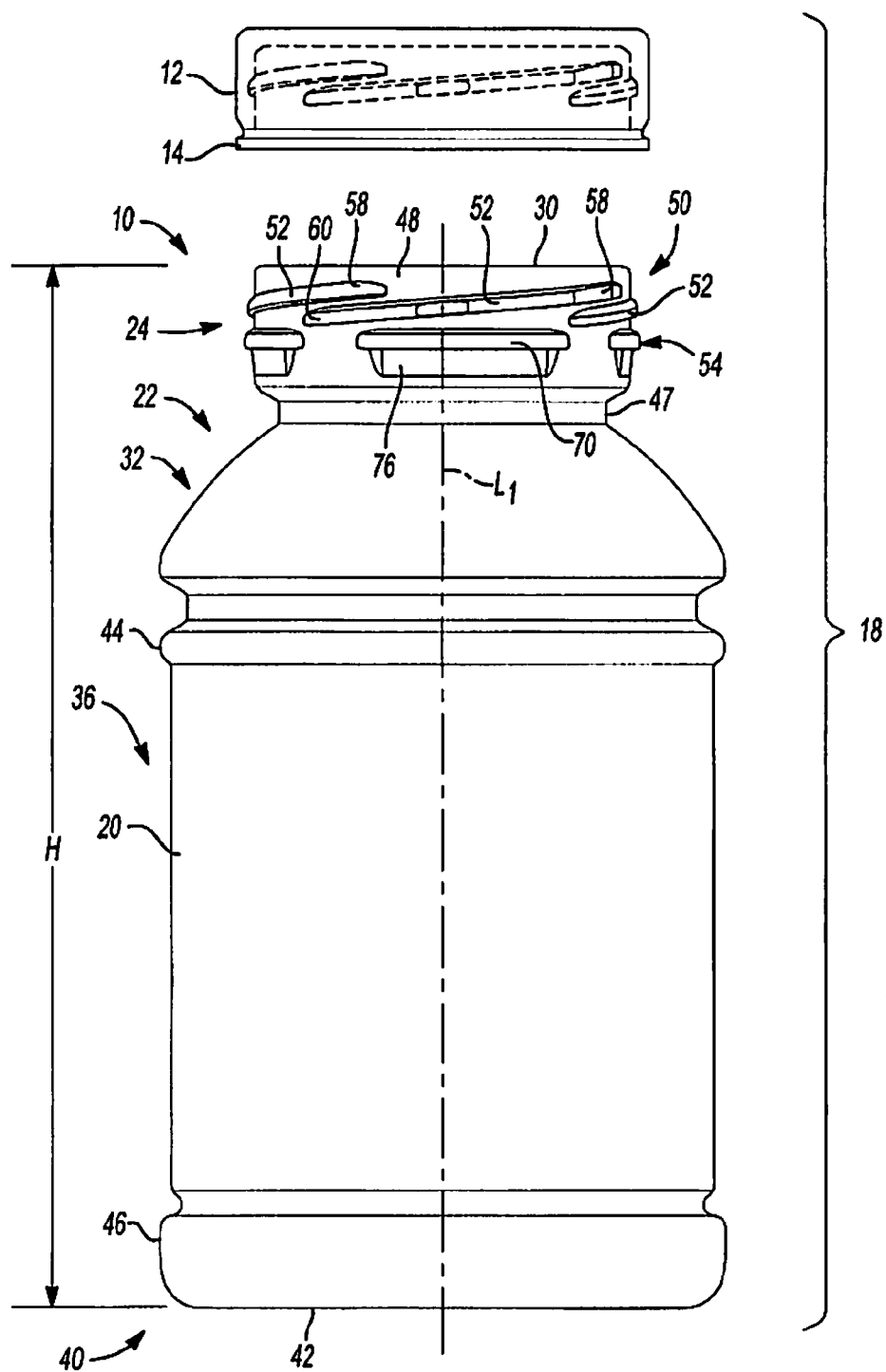
FIG. 1 is a side elevational view of a container constructed in accordance with the teachings of the present disclosure shown with an exemplary cap having a breakaway band attached to the cap prior to initial capping onto the container.
Figure 2:
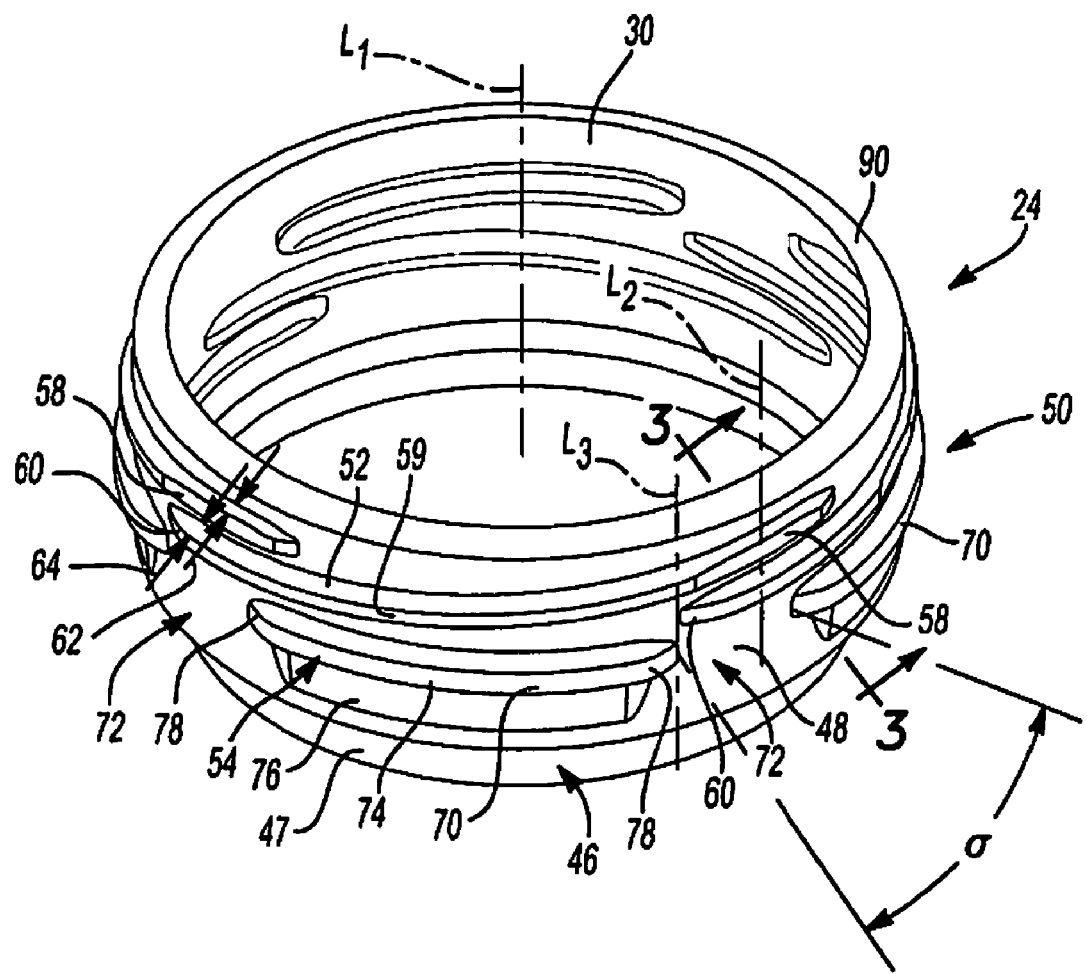
FIG. 2 is a detailed perspective view of a finish of the container shown in FIG. 1.

FIG. 1 shows one embodiment of the present container. In the Figures, reference number 10 designates a one-piece plastic, e.g. polyethylene terephthalate (PET), hot-fillable container. The container 10 is shown with an exemplary cap 12. The cap 12 includes a breakaway band 14. The container 10 and the cap 12 are collectively referred to herein as a container assembly 18. As shown in FIGS. 1 and 2, the exemplary container 10 defines a longitudinal axis $L_1$ and has an overall height H of about 177.10 mm (6.97 inches). The container 10 may be substantially cylindrical in cross section. In this particular embodiment, the container 10 has a volume capacity of about 32 fl. oz. (946 cc). Those of ordinary skill in the art would appreciate that the following teachings are applicable to other containers, such as rectangular, triangular, hexagonal, octagonal or square shaped containers, which may have different dimensions and volume capacities. It is also contemplated that other modifications can be made depending on the specific application and environmental requirements.

The container 10 according to the present teachings defines a body 20 and includes an upper portion 22 having a finish 24. The finish 24 defines an opening 30 into the container 10. Integrally formed with the finish 24 and extending downward therefrom is a shoulder region 32. The shoulder region 32 merges into and provides a transition between the finish 24 and a sidewall portion 36. The sidewall portion 36 extends downward from the shoulder region 32 to a base portion 40 having a base 42. An upper bumper portion 44 may be defined at a transition between the shoulder region 32 and the sidewall portion 36. A lower bumper portion 46 may be defined at a transition between the base portion 40 and the sidewall portion 36.

A neck 47 may also be included having an extremely short height, that is, becoming a short extension from the finish 24, or an elongated height, extending between the finish 24 and the shoulder region 32. The container 10 has been designed to retain a commodity. The commodity may be in any form such as a solid or liquid product. In one example, a liquid commodity may be introduced into the container 10 during a thermal process, typically a hot-fill process. For hot-fill bottling applications, bottlers generally fill the container 10 with a liquid or product at an elevated temperature between approximately 155° F. to 205° F. (approximately 68° C. to 96° C.) and seal the container 10 with the cap 12 before cooling. In addition, the container 10 may be suitable for other high-temperature pasteurization or retort filling processes or other thermal processes as well. In another example, the commodity may be introduced into the container 10 under ambient temperatures.

With continued reference to FIG. 2 and further reference to FIG. 3, the finish 24 will be described in greater detail. The finish 24 of the container 10 generally includes a radial sidewall 48 defining a threaded region 50 having threads 52, and a tamper evident (TE) band 54. Each thread 52 defines a thread start portion 58, a thread intermediate portion 59, and a thread run-out portion 60. As shown, each thread 52 slopes generally away from the opening 30 from the thread start portion 58 to the thread run-out portion 60. In general, the thread start portion 58 of one thread 52 is longitudinally aligned (i.e. aligned in a direction parallel to the longitudinal axis $L_1$ of the container 10) with a thread run-out portion 60 of an adjacent thread 52. As best shown in FIG. 2, each thread 52 defines a first depth 62 at the thread start portion 58, and a second depth 64 at the thread intermediate portion 59 and at the thread run-out portion 60. According to the present teachings, the first depth 62 is less than the second depth 64. More specifically, the first depth 62 is approximately 5-50% less than the second depth 64. By reducing the thread depth at the thread start portion 58, an improvement in repeatability of forming the thread run-out portion 60 is realized. In the exemplary finish 24, four (4) threads 52 are included, however, additional or fewer threads 52 are contemplated.

The TE band 54 will now be described. The TE band 54 is generally perpendicular to the longitudinal axis L1 of the container 10. The TE band 54 is collectively defined by a plurality of disconnected radial protrusions 70. Each radial protrusion 70 generally defines a body 74 and a ramped support portion 76. The body 74 further defines terminal sloped ends 78. A gap 72 is defined on the radial sidewall 48 of the finish 24 between adjacent radial protrusions 70. Each gap 72 is longitudinally aligned with a respective thread start portion 58 and a thread run-out portion 60. Explained further, a line L2 parallel to the longitudinal axis L1 extends through the thread start portion 58 of a first thread 52, the thread run-out portion 60 of a second thread 52, and the gap 72 (see FIG. 2). Depending on a thread pitch chosen for a given container, the gap 72 can range between approximately 5-32 degrees of the finish diameter (indicated as angle σ in FIG. 2). Furthermore, a line L3 parallel to the longitudinal axis L1 extends through a terminal end of the thread run-out portion 60 and a counter-clockwise (as viewed from the opening 30) terminal sloped end 78 of a body 74 (see FIG. 2). The discontinuous nature of the TE band 54 and more specifically the spacing of the gap 72 relative to the thread run-out portion 60 improves the formation of the thread run-out portion 60, and the threads 52 as a whole.

Figure 3:
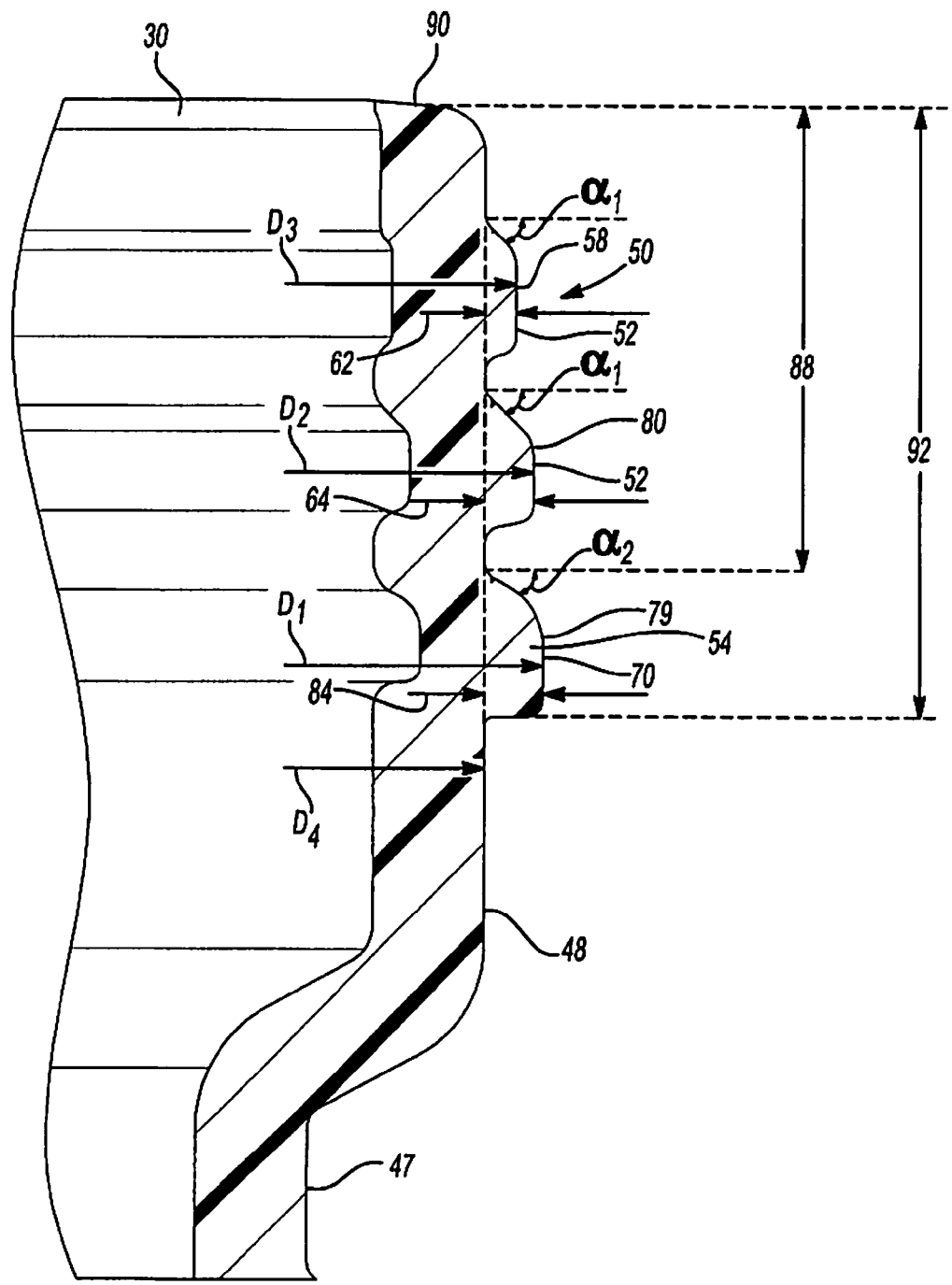
FIG. 3 is a sectional view of the finish taken along line 3-3 of FIG. 2.

With reference to FIG. 3, exemplary dimensions for the finish 24 will be described. It is appreciated that other dimensions may be used. A diameter $D_1$ is defined at an outermost surface 79 of the TE band 54. A diameter $D_2$ is defined at an outermost surface 80 of the thread 52. A diameter $D_3$ is defined at the thread start portion 58. It is appreciated in the example shown, that the relative placement of the threads 52 around the finish 24 allows a diameter to be defined across diametrically opposed outermost surfaces 80 as well as diametrically opposed thread start portions 58. Those skilled in the art will appreciate that such an arrangement is not required.

A diameter $D_4$ is defined by the radial sidewall 48. A TE band depth 84 is defined laterally between the outermost surface 79 of the TE band 54 and the radial sidewall 48. The TE band 54 is formed between a first and second height 88 and 92, respectively on the finish 24. The first height 88 extends between an upper surface 90 of the radial sidewall 48 and an upper boundary of the TE band 54. The second height 92 extends between the upper surface 90 of the radial sidewall 48 and a lower boundary of the TE band 54.

According to one example, the diameter $D_1$ can be 63.02 mm (2.48 inches). The diameter $D_2$ can be 62.08 mm (2.44 inches). The diameter $D_3$ can be 61.32 mm (2.41 inches). The diameter $D_4$ can be 59.99 mm (2.36 inches). An angle $\alpha_1$ of the thread 52 extends from a line perpendicular to the finish 24 to the thread 52 can be about 45 degrees. An angle $\alpha_2$ of the TE band 54 extends from a line perpendicular to the finish 24 to the TE band 54 can be about 30 degrees.

Figure 4:
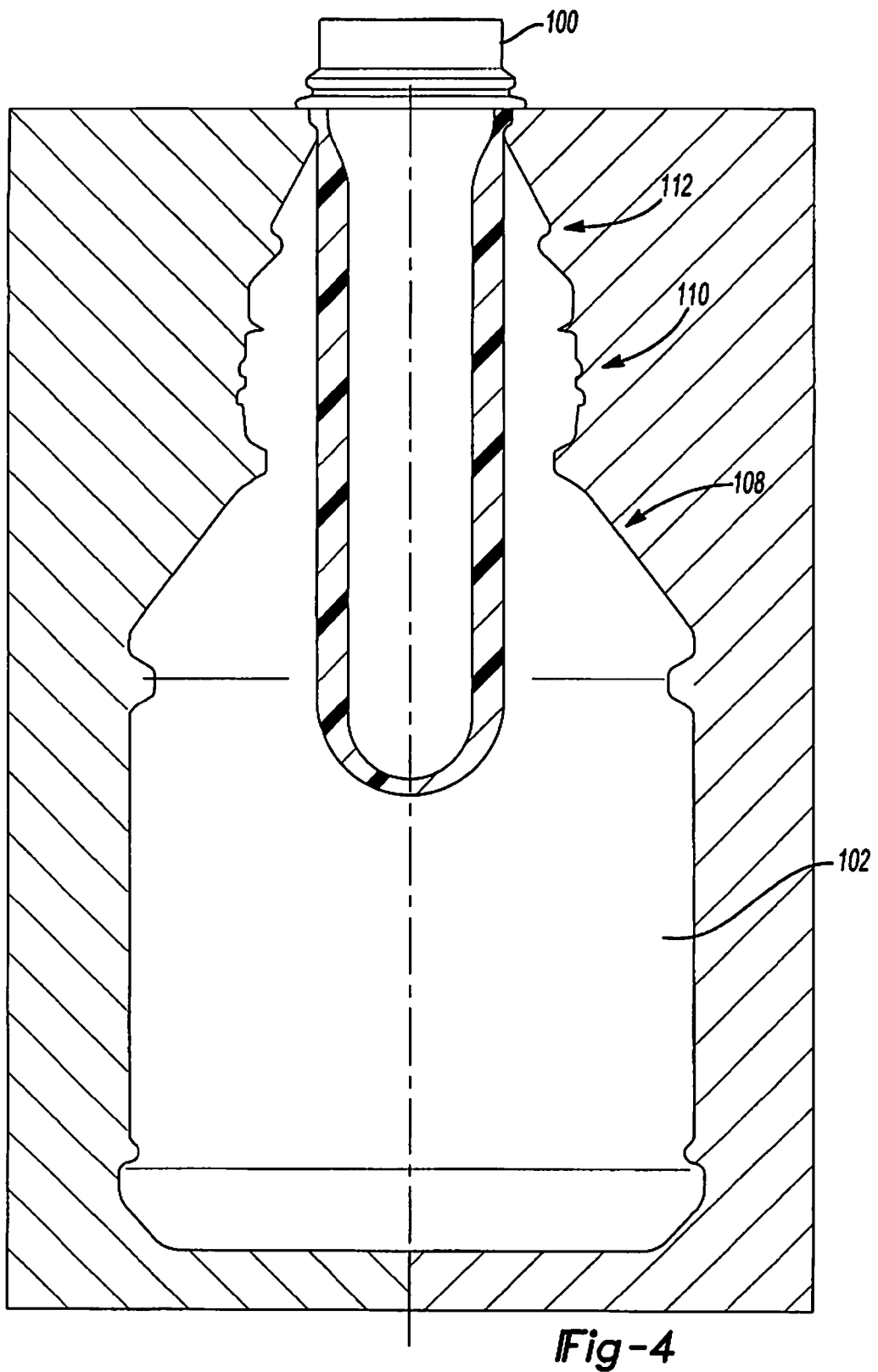
FIG. 4 is a sectional view of an exemplary mold cavity used during formation of the container of FIG. 1 and shown with a preform positioned therein.

The container 10 of the present invention is a blow molded, biaxially oriented container with a unitary construction from a single or multi-layer material. A well-known stretch-molding, heat-setting process for making the container 10 generally involves the manufacture of a preform 100 (FIG. 4) of a polyester material, such as polyethylene terephthalate (PET), having a shape well known to those skilled in the art similar to a test-tube with a generally cylindrical cross section and a length typically approximately fifty percent (50%) that of the resultant container height.

Figure 5:
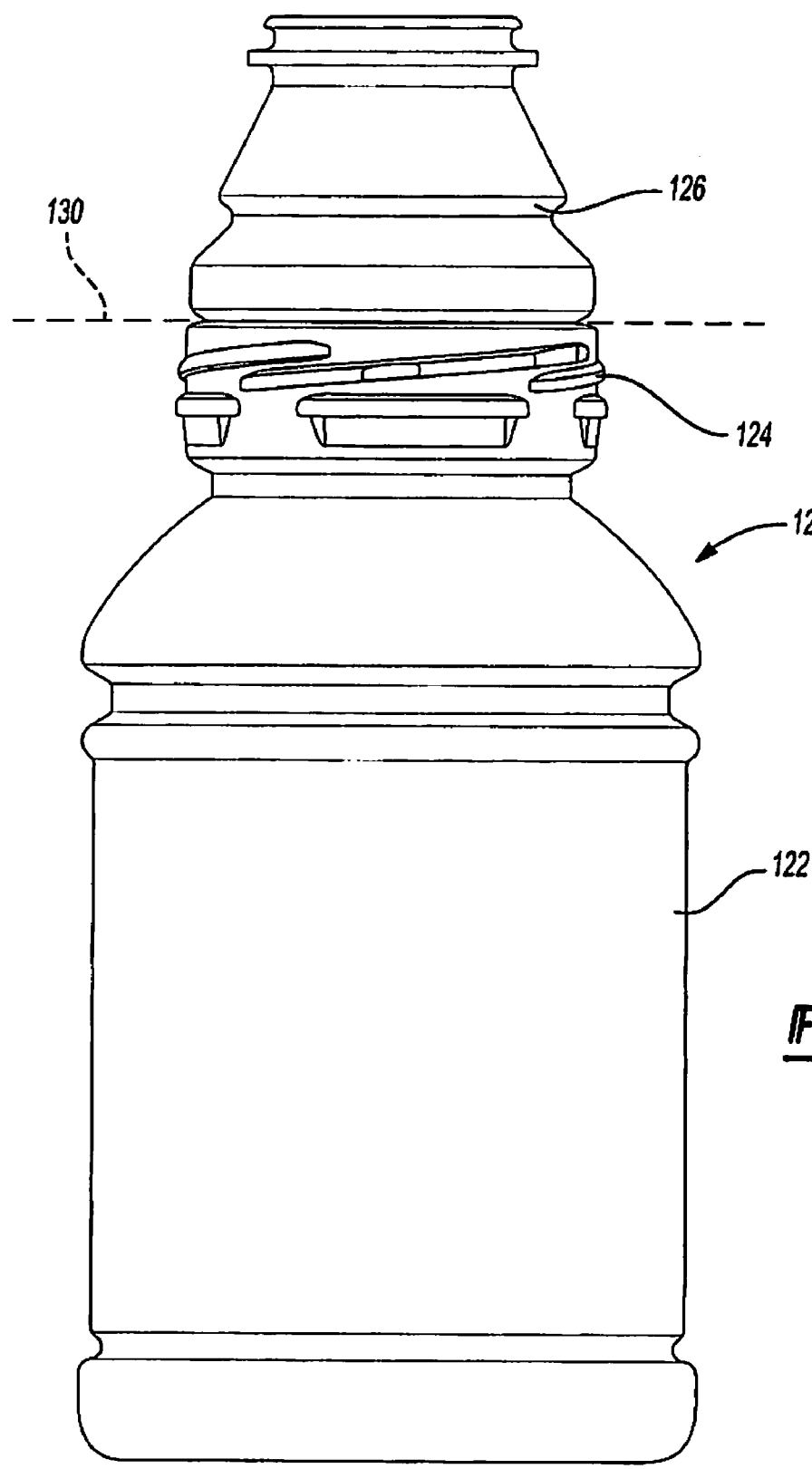
FIG. 5 is a side elevational view of an intermediate container formed in the mold cavity of FIG. 4.

An exemplary method of forming the container 10 will be described. At the outset, the preform 100 may be placed into a mold cavity 102. In general, the mold cavity 102 has an interior surface corresponding to a desired outer profile of the blown container. More specifically, the mold cavity 102 according to the present teachings defines a body-forming region 108, a finish forming region 110 and a moil-forming region 112. The resultant structure, hereinafter referred to as an intermediate container 120, as illustrated in FIG. 5, generally includes a body 122, a finish 124 and a moil 126.

In one example, a machine (not illustrated) places the preform 100 heated to a temperature between approximately 190° F. to 250° F. (approximately 88° C. to 121° C.) into the mold cavity 102. The mold cavity 102 may be heated to a temperature between approximately 250° F. to 350° F. (approximately 121° C. to 177° C.). A stretch rod apparatus (not illustrated) stretches or extends the heated preform 100 within the mold cavity 102 to a length approximately that of the intermediate container 120 thereby molecularly orienting the polyester material in an axial direction generally corresponding with the central longitudinal axis $L_1$ of the container 10. While the stretch rod extends the preform 100, air having a pressure between 300 PSI to 600 PSI (2.07 MPa to 4.14 MPa) assists in extending the preform 100 in the axial direction and in expanding the preform 100 in a circumferential or hoop direction thereby substantially conforming the polyester material to the shape of the mold cavity 102 and further molecularly orienting the polyester material in a direction generally perpendicular to the axial direction, thus establishing the biaxial molecular orientation of the polyester material in most of the intermediate container 120. The pressurized air holds the mostly biaxial molecularly oriented polyester material against the inner surface of the mold cavity 102 for a period of approximately two (2) to five (5) seconds before removal of the intermediate container 120 from the mold cavity 102. This process is known as heat setting and results in a heat-resistant container suitable for filling with a product at high temperatures.

In another example, a machine (not illustrated) places the preform 100 heated to a temperature between approximately 185° F. to 239° F. (approximately 85° C. to 115° C.) into the mold cavity 102. The mold cavity 102 may be chilled to a temperature between approximately 32° F. to 75° F. (approximately 0° C. to 24° C.). A stretch rod apparatus (not illustrated) stretches or extends the heated preform 100 within the mold cavity 102 to a length approximately that of the intermediate container 120 thereby molecularly orienting the polyester material in an axial direction generally corresponding with the central longitudinal axis $L_1$ of the container 10. While the stretch rod extends the preform 100, air having a pressure between 300 PSI to 600 PSI (2.07 MPa to 4.14 MPa) assists in extending the preform 100 in the axial direction and in expanding the preform 100 in a circumferential or hoop direction thereby substantially conforming the polyester material to the shape of the mold cavity 102 and further molecularly orienting the polyester material in a direction generally perpendicular to the axial direction, thus establishing the biaxial molecular orientation of the polyester material in most of the intermediate container 120. The pressurized air holds the mostly biaxial molecularly oriented polyester material against the inner surface of the mold cavity 102 for a period of approximately two (2) to five (5) seconds before removal of the intermediate container 120 from the mold cavity 102. This process is utilized to produce containers suitable for filling with product under ambient conditions or cold temperatures.

Alternatively, other manufacturing methods using other conventional materials including, for example, high density polyethylene, polypropylene, polyethylene naphthalate (PEN), a PET/PEN blend or copolymer, and various multi-layer structures may be suitable for the manufacture of container 10. Those having ordinary skill in the art will readily know and understand container manufacturing method alternatives.

Once the intermediate container 120 has been formed, the intermediate container 120 may be removed from the mold cavity 102. As can be appreciated, the intermediate container 120 defines the container 10 (FIG. 1) and the moil 126 prior to formation of the opening 30 (FIG. 2). An intersection between the finish 124 and the moil 126 defines a cutting plane 130 (FIG. 5). The moil 126 is subsequently severed from the finish 124 at the cutting plane 130. The severing process may be any suitable cutting procedure that removes the moil 126 and creates the opening 30.

While the above description constitutes the present disclosure, it will be appreciated that the disclosure is susceptible to modification, variation and change without departing from the proper scope and fair meaning of the accompanying claims.

What is claimed is:
1. A plastic container comprising:
   a body having an upper portion, a sidewall portion and a base portion, said upper portion including a blown finish defining a longitudinal axis and an opening into the container;
   a tamper evident (TE) band formed on said finish and defining a first diameter at an outermost surface; and at least one thread formed on said finish with a thread run-out portion, said at least one thread defining a second diameter at an outermost surface, wherein said first diameter is greater than said second diameter;

wherein said TE band extends circumferentially about the finish and defines at least two disconnected radial protrusions; and wherein a line parallel to said longitudinal axis passes through a terminal end of said thread run-out portion and a terminal end of one of said at least two radial protrusions of said TE band.

2. The plastic container of claim 1 wherein said TE band defines a gap between each respective disconnected radial protrusions.

3. The plastic container of claim 2 wherein said gap defines approximately five (5) to thirty-two (32) degrees of a circumference of said finish.

4. The plastic container of claim 2 wherein each thread of said at least one thread defines a thread start portion and said thread run-out portion.

5. The plastic container of claim 4 wherein a line parallel to said longitudinal axis extends through said thread run-out portion and said gap.

6. The plastic container of claim 4 wherein said at least one thread defines a first thread and a second thread, wherein said first thread defines a first depth at said thread start portion and said second thread defines a second depth at said thread run-out portion, wherein said thread start portion and said thread run-out portion are longitudinally aligned around said finish and said first depth is less than said second depth.

7. The plastic container of claim 6 wherein said first depth is approximately 5-50% less than said second depth.

8. The plastic container of claim 6 wherein said thread run-out portion and said gap are longitudinally aligned around said finish.

9. The plastic container of claim 1, wherein said at least two disconnected radial protrusions each include a body and a ramped support portion, said body being disposed between said opening and said ramped support portion in a direction parallel to said longitudinal axis.

10. A plastic container comprising:
a body having an upper portion, a sidewall portion and a base portion, said upper portion including a blown finish defining a longitudinal axis and an opening into the container;
a tamper evident (TE) band formed on said finish, said TE band extending circumferentially about the finish and defining a first diameter at an outermost surface, said TE band defining a first radial protrusion and a second radial protrusion separated by a gap defined on said finish;
a first thread formed on said finish defining a first thread start portion and a first thread run-out portion, said first thread defines a first depth at said first thread start portion and a second depth at said first thread run-out portion, said first depth less than said second depth;
a second thread formed on said finish defining a second thread start portion and a second thread run-out portion;

wherein said first thread start portion, said second thread run-out portion, and said gap are aligned longitudinally on said finish; and wherein a line parallel to said longitudinal axis passes through a terminal end of said thread run-out portion and a terminal end of one of said first and second radial protrusions of said TE band.

11. The plastic container of claim 10 wherein said first depth is approximately 5-50% less than said second depth.

12. The plastic container of claim 10 wherein said gap defines approximately five (5) to thirty-two (32) degrees of a circumference of said finish.

13. The plastic container of claim 10 wherein said finish is a polyethylene terephthalate (PET) blown finish.

14. The plastic container of claim 10, wherein said first and second radial protrusions each include a body and a ramped support portion, said body being disposed between said opening and said ramped support portion in a direction parallel to said longitudinal axis.

15. A method of forming a blow-molded plastic container comprising:
disposing a preform into a mold cavity having a mold surface defining a body forming region, a base forming region and a finish forming region; and
blowing said preform against said mold surface and forming:
a body defining a longitudinal axis, a base and a finish, said finish having a first portion defining a tamper evident (TE) band, said TE band extending circumferentially about the finish and having at least two disconnected radial protrusions and a gap defined between each respective disconnected radial protrusions;
a first thread on said finish defining a first thread start portion having a first depth and a first thread run-out portion having a second depth, wherein said first depth is less than said second depth;
a second thread on said finish defining a second thread start portion and a second thread run-out portion, wherein said first thread start portion, said second thread run-out portion, and said gap are aligned longitudinally on said finish;
wherein a line parallel to said longitudinal axis passes through a terminal end of one of said first and second thread run-out portions and a terminal end of one of said at least two radial protrusions of said TE band.

16. The method of claim 15 wherein said first depth is approximately 5-50% less than said second depth.

17. The method of claim 15 wherein blowing said preform includes forming said gap, wherein said gap defines approximately five (5) to thirty-two (32) degrees of a circumference of said finish.

18. The method of claim 15, wherein said finish defines an opening into the container, and wherein said at least two disconnected radial protrusions each include a body and a ramped support portion, said body being disposed between said opening and said ramped support portion in a direction parallel to said longitudinal axis.

* * * * *

UNITED STATES PATENT AND TRADEMARK OFFICE
CERTIFICATE OF CORRECTION

| | | |
|---|---|---|
| PATENT NO. | : 8,292,102 B2 | Page 1 of 1 |
| APPLICATION NO. | : 11/821119 | |
| DATED | : October 23, 2012 | |
| INVENTOR(S) | : Penny et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1267 days.

Signed and Sealed this
Thirtieth Day of September, 2014

Michelle K. Lee
*Deputy Director of the United States Patent and Trademark Office*